United States Patent
Okamoto et al.

(10) Patent No.: US 6,808,622 B2
(45) Date of Patent: Oct. 26, 2004

(54) WASTEWATER PURIFYING APPARATUS

(75) Inventors: Ryoichi Okamoto, Fukuyama (JP); Masayuki Komurasaki, Fukuyama (JP); Hirofumi Niki, Fukuyama (JP)

(73) Assignee: Eiwa Country Environment Co., Ltd., Hiroshima (JP)

( * ) Notice: Subject to any disclaimer, the term of this patent is extended or adjusted under 35 U.S.C. 154(b) by 7 days.

(21) Appl. No.: 10/181,244

(22) PCT Filed: Oct. 12, 2001

(86) PCT No.: PCT/JP01/08961

§ 371 (c)(1),
(2), (4) Date: Jul. 15, 2002

(87) PCT Pub. No.: WO03/033420

PCT Pub. Date: Apr. 24, 2003

(65) Prior Publication Data

US 2003/0132148 A1 Jul. 17, 2003

(51) Int. Cl.[7] .................................................. C02F 3/06
(52) U.S. Cl. ........................ 210/151; 210/202; 210/259; 210/266; 210/617; 210/903
(58) Field of Search ................................ 210/150, 151, 210/220, 209, 257.2, 259, 266, 617, 620, 903, 202

(56) References Cited

U.S. PATENT DOCUMENTS

| | | | | |
|---|---|---|---|---|
| 4,933,076 A | * | 6/1990 | Oshima et al. | 210/151 |
| 5,160,622 A | * | 11/1992 | Gunderson et al. | 210/617 |
| 5,702,604 A | * | 12/1997 | Yamasaki et al. | 210/151 |
| 6,291,233 B1 | * | 9/2001 | Saha et al. | 210/617 |

FOREIGN PATENT DOCUMENTS

| | | | |
|---|---|---|---|
| JP | 08-117776 | * | 5/1996 |
| JP | 09-37996 | * | 2/1997 |
| JP | 10-323694 | * | 12/1998 |
| JP | 11-285695 | * | 10/1999 |
| JP | 2002-237791 | * | 9/2000 |
| JP | 2003-39086 | * | 2/2003 |

* cited by examiner

*Primary Examiner*—Christopher Upton
(74) *Attorney, Agent, or Firm*—Jordan and Hamburg LLP

(57) ABSTRACT

To purify wastewater discharged from lavatories (3), a wastewater purifying apparatus having a shell contact aeration chamber (6, 7) placed with shell microbial carrier members (15), the wastewater being fed to and purified in the shell contact aeration chamber (6, 7). Shells whose mother-of-pearl layer on the inner surface (b) is at least removed are used as the microbial carrier member (15).

5 Claims, 6 Drawing Sheets

WASTEWATER PURIFYING APPARATUS

TECHNICAL FIELD

The present invention relates to a wastewater purifying apparatus which can process swiftly and efficiently wastewater containing human excrement discharged from lavatories and the like.

BACKGROUND ART

Heretofore, as described, for example, in Japanese Unexamined Patent Publication No. 9-37996, advanced wastewater processing apparatuses that efficiently process wastewater containing human excrement discharged from lavatories or the like by aerating the wastewater in an aeration chamber in the presence of oyster shells as microbial carriers and send the processed water for reutilization as, e.g., flushing water of flush water closets have been known. The advanced wastewater processing apparatus, having an aeration chamber containing microbial carriers made of oyster shell, has advantages in that acidified wastewater can be neutralized by calcium carbonate which become dissolved into the wastewater from the oyster shell, and the wastewater can be purified more efficiently due to increased efficiency of aeration and biological digestion of the wastewater on the surface of the oyster shells.

However, when the oyster shell is used as the microbial carrier in the aeration chamber of the advanced wastewater processing apparatus above, there has been pointed out a problem of a prolonged start-up period, i.e., in that only after a predetermined period from the initial date of operation of the advanced wastewater purification apparatus, the full potential of the apparatus for neutralization and decomposition and purification of the wastewater can be exerted.

In view of the above problem, the present invention has been worked out, and an object of the present invention is to provide a wastewater processing apparatus which does not require a prolonged start-up period and can effectively purify wastewater.

DISCLOSURE OF THE INVENTION

The present invention is directed to a wastewater purifying apparatus having a shell contact aeration chamber placed with microbial carrier shells. Wastewater is fed to and purified in the shell contact aeration chamber. Shells whose mother-of-pearl layer on the inner surface is at least removed are used as microbial carrier. A shell whose porous prismatic layer is exposed owing to the removal of the mother-of-pearl layer on the surface has an excellent function as microbial carrier to be used for purification of wastewater because it has a high affinity to microorganisms and the like which purify wastewater, and it can easily become dissolved into the wastewater.

Additionally, the present invention is directed to a wastewater purifying apparatus further provided with an activated carbon adsorption chamber packed with coal-based activated carbon and arranged downstream of the shell contact aeration chamber. In such an arrangement, treated wastewater purified in the aeration chamber described above is transferred to the activated carbon adsorption chamber where the wastewater is effectively decolorized.

Additionally, the present invention is directed to a wastewater purifying apparatus further provided with a denitrification chamber arranged upstream of the shell contact aeration chamber placed with a bioreactor including a membranous container containing a hydrogen donor. In such an arrangement, ammonia components in the wastewater are converted, via nitrous acid and nitric acid, to nitrogen gas and thus removed from the wastewater by denitrification of denitrifying bacteria adherent to the surface of the membranous container through the use of the hydrogen donor.

BEST MODE FOR CARRYING OUT THE INVENTION

Figure 1:
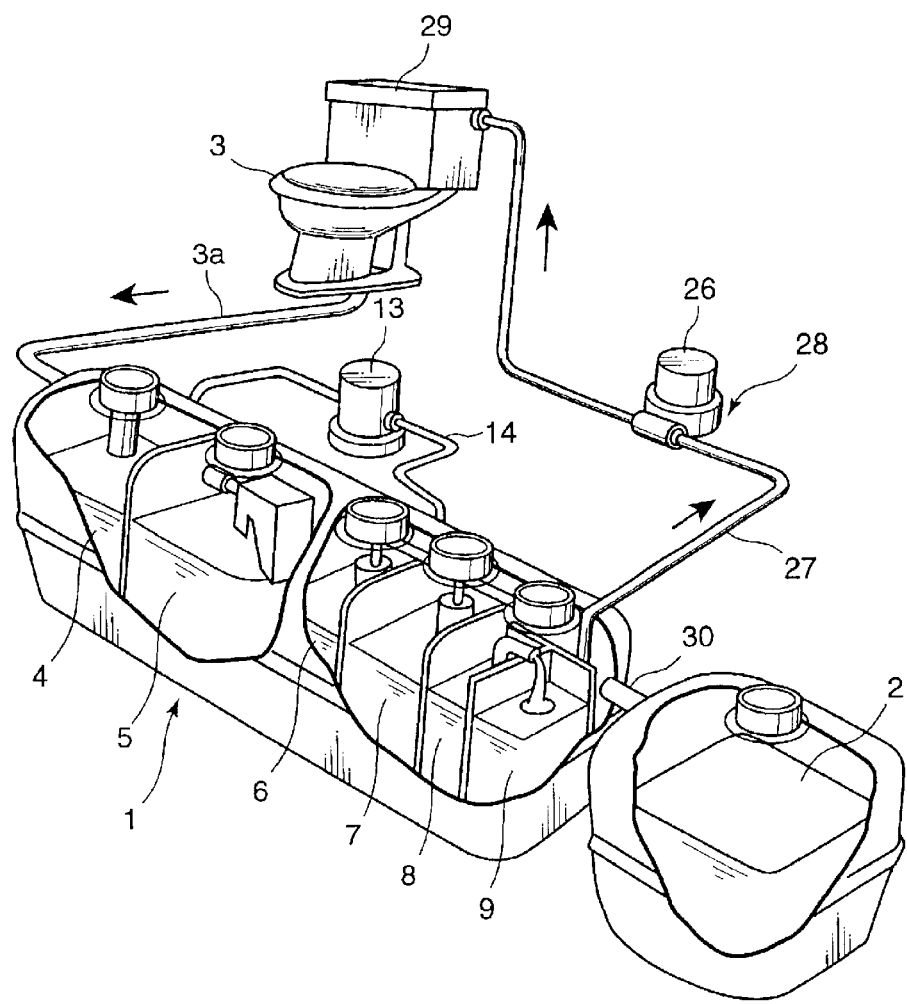
FIG. 1 is a perspective view showing a wastewater purifying apparatus in a first embodiment of the present invention.

The present invention will be described more in detail referring to the drawings attached.

Figure 2:
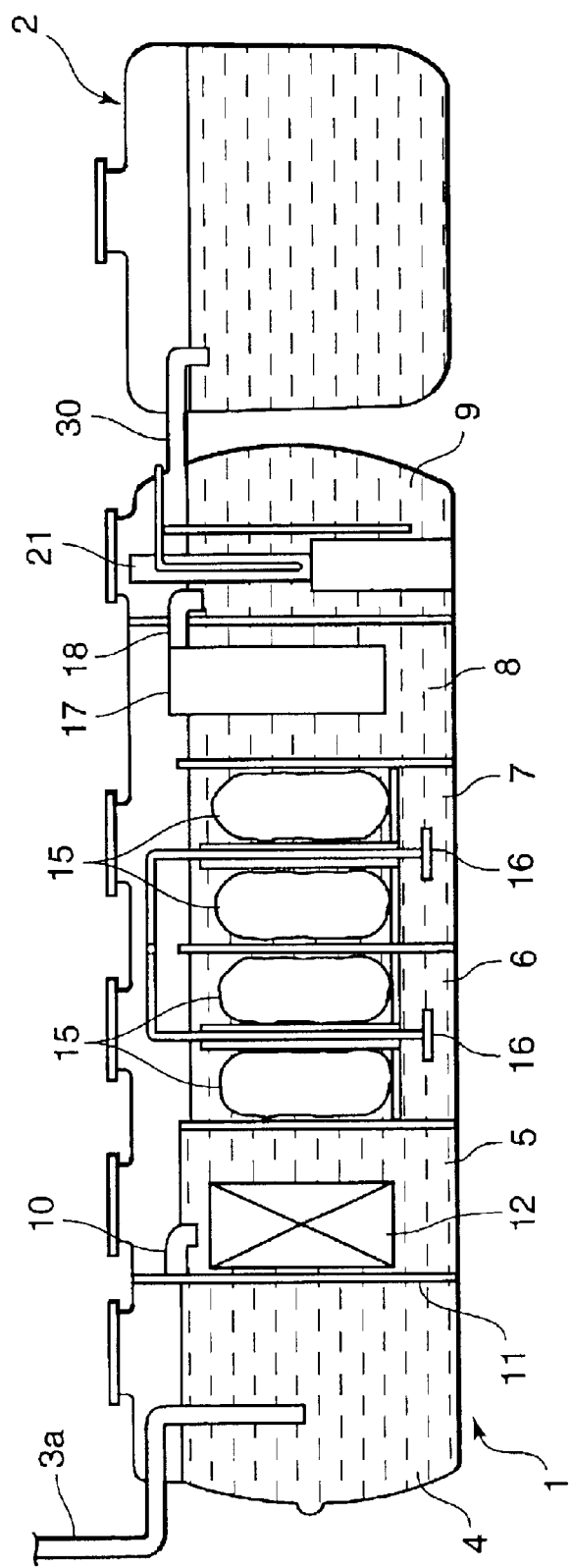
FIG. 2 is a diagram illustrating the wastewater purifying apparatus of the first embodiment.

FIG. 1 and FIG. 2 illustrate a wastewater purifying apparatus in a first embodiment of the present invention. The wastewater purifying apparatus comprises a wastewater processing tank 1, and a storage tank 2 for storing purified wastewater from the processing tank 1, both of which are made of a material such as steel, aluminum alloy, stainless steel, plastic, prestressed concrete, armored concrete, fiber reinforced plastic, etc., and usually used as they are laid underground.

The wastewater processing tank 1 further comprises, a settling chamber 4 for separating solids in wastewater discharged, via an influent pipe 3a, from a lavatory 3, an aeration chamber 5 for aerating the clarified wastewater transferred from the settling chamber 4, first and second shell contact aeration chambers, 6 and 7 for further aerating the processed wastewater transferred from the aeration chamber 5, a sedimentation filtration chamber 8 for sedimentation and filtration of the processed wastewater transferred from the second shell contact aeration chamber 7, and an activated carbon adsorption chamber 9 for decolorizing the supernatant processed wastewater transferred from the sedimentation filtration chamber 8.

In the settling chamber 4, papers and other bulky foreign particles in the wastewater are separated by sedimentation, and the solid-free clarified wastewater is transferred via a conduit tube 10 to the downstream aeration chamber 5, and the settling chamber 4 is fitted with a baffle plate 11 for preventing washout of suspended solids into the aeration chamber 5. The solid sediments in the settling chamber 4, by the way, are withdrawn periodically, (for example, once a year), and separately processed.

In the aeration chamber 5, are arranged a contact zone placed with known plastic microbial carriers 12, and an aeration nozzle 14 beneath the contact zone for diffusing air supplied from a blower 13. The clarified wastewater in the aeration chamber 5 transferred from the settling chamber 4 is agitated by the air released from an aeration nozzle 14, and excrements in the clarified wastewater are decomposed by microorganisms living adherent to the surface of the plastic microbial carriers 12.

In each of the first and second shell contact aeration chambers, 6 and 7, are arranged microbial carrier members 15, a mesh bag packed with microbial carrier shells of shellfish such as oyster, scallop, Sakhalin surf clam, pearl shell, clam, fresh water clam, short-necked clam, Chinese mecta, mussel, top shell, giant clam, etc., or fossil shell, and an aeration nozzle 16 beneath it for releasing the air supplied from the blower 13.

Figure 3:
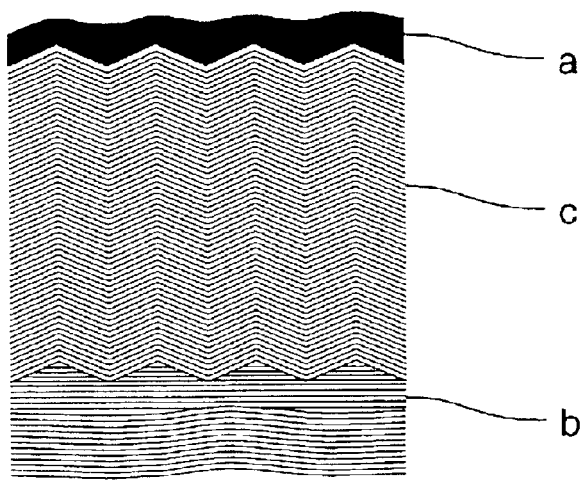
FIG. 3 is a sectional view illustrating a shell structure.
Figure 4:
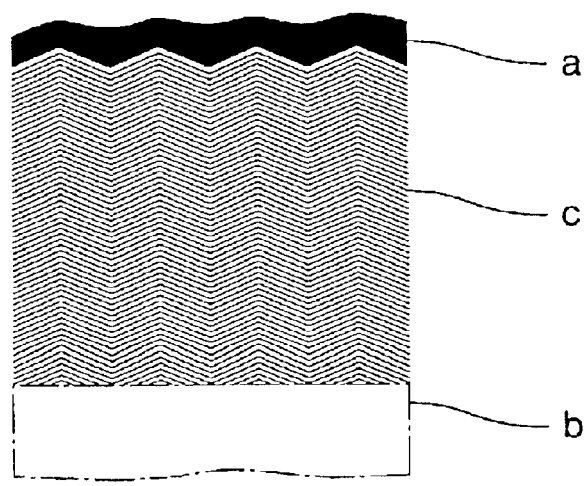
FIG. 4 is a sectional view illustrating a structure of a shell used in the wastewater purifying apparatus.

The shell contains calcium carbonate as a major component and calcium phosphate, magnesium carbonate, etc., as minor components, and, as shown in FIG. 3, has a three-layered structure comprising an outer layer of shell epidermis a, an inner layer of mother-of-pearl layer b, and an intermediate layer of prismatic layer c. As shown in FIG. 4, the microbial carrier member 15 described above is a bag packed with shells not having the mother-of-pearl layers b.

Examples of the process to remove the mother-of-pearl layer b from shell include a method to scrape off the mother-of-pearl layer b by means of a proper machine tool, a method to leave the shell at the water's edge of seashore for a period of about 1 year and allow natural erosion of the mother-of-pearl layer b, a method to dissolve the mother-of-pearl layer b by the use of a chemical, such as hydrochloric acid and the like, and a method to scrape off the mother-of-pearl layer b by agitating numbers of shells in a mixer and thus making mutual grinding among the shells. When the mother-of-pearl layer b was removed either by the natural erosion method or the agitation method described above, part of the shell epidermis is also to be removed along with the mother-of-pearl layer b.

The treated wastewater in the first shell contact aeration chamber 6 transferred as the overflow of the aeration chamber 5 is agitated by the air released from the aeration nozzle 16 and the excrements in the wastewater are decomposed by microorganisms living adherent to the surface of the shell microbial carrier member 15. Subsequently, the wastewater in the second shell contact aeration chamber 7 transferred as the overflow of the first shell contact aeration chamber 6 is agitated by the air released from the aeration nozzle 16, and the excrements in the wastewater are further decomposed by microorganisms living adherent to the surface of the shell microbial carrier member 15, and subsequently transferred as the overflow to the sedimentation filtration chamber 8.

Figure 5:
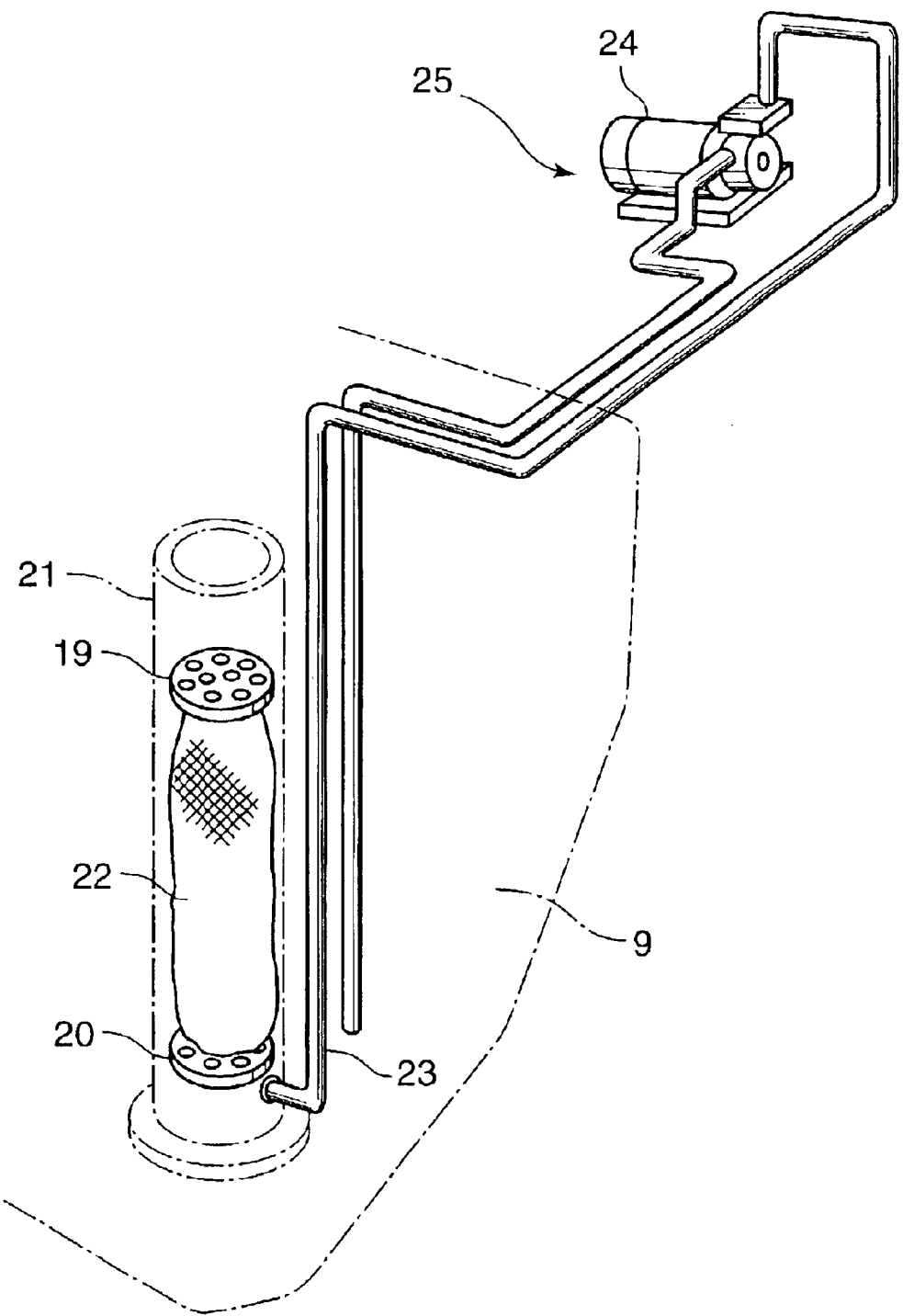
FIG. 5 is a perspective view showing a specific arrangement of a circulation system.

In the sedimentation filtration chamber 8 having a filter 17 packed with porous zeolites, impurities in the treated wastewater transferred from the second shell contact aeration chamber 7 settle down, bringing separation of the sediment and the supernatant, and smaller impurities which remain in the supernatant is then filtrated through the filter 17, and the filtrated supernatant wastewater is transferred, via a conduit tube 18, to the activated carbon adsorption chamber 9 As shown in FIG. 5, in the activated carbon adsorption chamber 9 are arranged an adsorption column 21 wherein two partition plates 19 and 20, having a plurality of holes are placed at the upper and lower positions thereof, and an activated carbon container 22 between the two partition plates 19 and 20, and the circulation system including circulation pipes 23 and a circulation pump 24 for withdrawing the wastewater in the activated carbon adsorption chamber 9 and for pumping into the lower portion of the activated carbon container 22. The activated carbon container 22 includes a bag made of fabric or the like, and a coal-based activated carbon to be placed therein. The wastewater pumped into the lower portion of the activated carbon container 22 by the circulation system 25 flows through the adsorption column 21, and circulates back into the activated carbon adsorption chamber 9, whereby colored components are adsorbed by the coal-based activated carbon in the activated carbon container 22, and thus the wastewater is decolorized efficiently.

As shown in FIG. 1, part of the purified wastewater decolorized in the activated carbon adsorption chamber 9 as described above, is supplied to a feed tank 29 of the lavatories 3 by a water supplier 28 including a pump 26 and a feed pipe 27, and the other part is transferred, via a conduit tube 30, to the storage tank 2 for storage.

As described above, the use of shell such as oyster shell, of which at least the inner mother-of-pearl layer b is removed and the porous prismatic layer is exposed, as the microbial carrier member 15 to be used in the first and second shell contact aeration chambers 6 and 7 of the wastewater purifying apparatus, makes it possible to increase an affinity of the microbial carrier member 15 for microorganisms decomposing the excrements in the wastewater in the first and second shell contact aeration chamber 6 and 7 withdrawn from the filtration chamber 5, and thus to propagate the microorganisms adequately. That is, by the microorganisms propagated on the surface of the porous prismatic layer c, excrements in the wastewater can be decomposed and the wastewater purified more efficiently.

The use of the shell as the microbial carrier member 15 has an additional advantage in that it is possible to make the microorganisms exercise the decomposition and other functions from the beginning of operation after installment of the wastewater purifying apparatus, thus preventing possible environmental pollution which may occur during the start-up period when the purified wastewater processed by the wastewater purifying apparatus is discharged outside, and to utilize water resource more efficiently by reutilizing the purified water as flushing water of the lavatories 3.

Additionally, when the wastewater is acidified as a result of aeration of the wastewater in the aeration chamber 5 and in the first and second shell contact aeration chambers 6 and 7, calcium carbonate becomes dissolved from the shell neutralizing the wastewater. That is, the shell of which the mother-of-pearl layer b is scraped off has an advantage in that it can neutralize the acidified wastewater more efficiently due to its higher tendency to be dissolved in the wastewater.

Since the wastewater is neutralized in the first and second shell contact aeration chambers 6 and 7 as described above, protozoan such as heliozoan and coelenterates can be developed and proliferated in large quantity. Therefore, by extinguishing bacteria such as *Escherichia coli* and the like present in the wastewater through predation by the protozoa, it becomes possible to efficiently prevent bacterial contamination of the purified wastewater from the wastewater purifying apparatus.

Further, when the wastewater contains phosphorus components, the phosphorus components can be reacted with calcium carbonate to yield calcium phosphate. Thus, the use of the shell as the microbial carrier member 15 has an additional advantage in that the calcium phosphate thus formed is adsorbed on the activated carbon in the activated carbon container 22 arranged in the activated carbon adsorption chamber 9, and can be recovered for use as a fertilizer or the like.

Meanwhile, part of the calcium phosphate in the wastewater precipitates in the sedimentation filtration chamber 8 and is adsorbed in the filter 15, and the other part is adsorbed on the activated carbon in the activated carbon adsorption chamber 9. For the purpose of removing a minute amount of the phosphorus components which remains in the wastewater, it is desirable to place an additional phosphorus adsorption column placed with the shells such as oyster shell and the like in the activated carbon adsorption chamber 9.

To evaluate wastewater purification performance of the wastewater purifying apparatus shown in FIG. 1 and FIG. 2, experiments to determine the wastewater purification performance have been carried out, in Inventive Example wherein an oyster shell of which the mother-of-pearl layer b was scraped off was used as the microbial carrier member 15 in the first and second shell contact aeration chambers 6 and 7, Comparative Example 1 wherein a known plastic microbial carrier is used, and Comparative Example 2 wherein an untreated oyster shell having the mother-of-pearl layer b was used as the microbial carrier, and the results are shown in the following TABLES 1 to 7.

TABLE 1

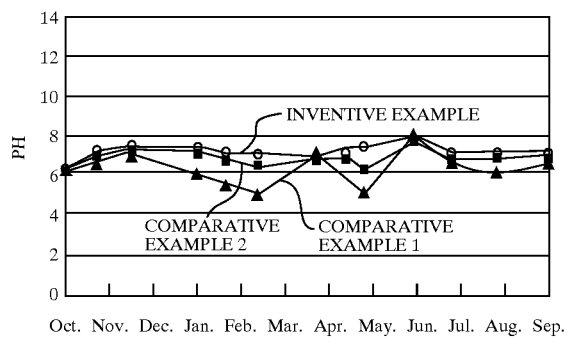

TABLE 2

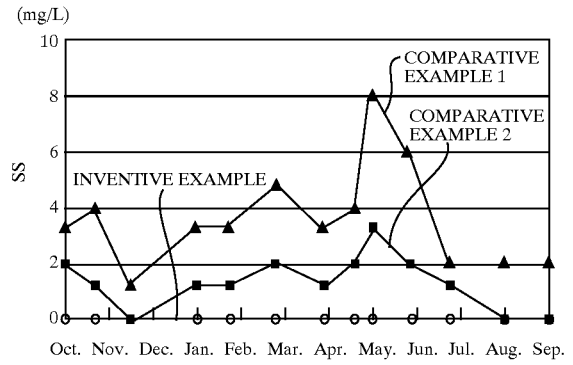

TABLE 3

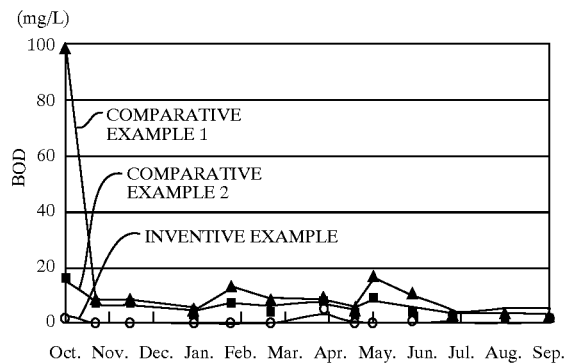

TABLE 4

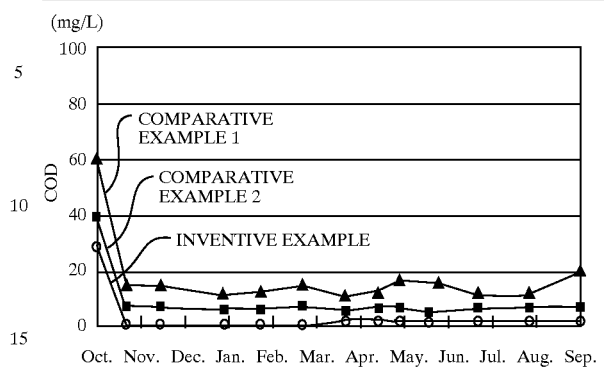

TABLE 5

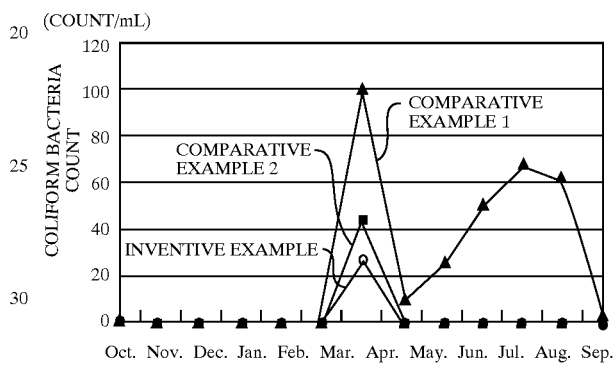

TABLE 6

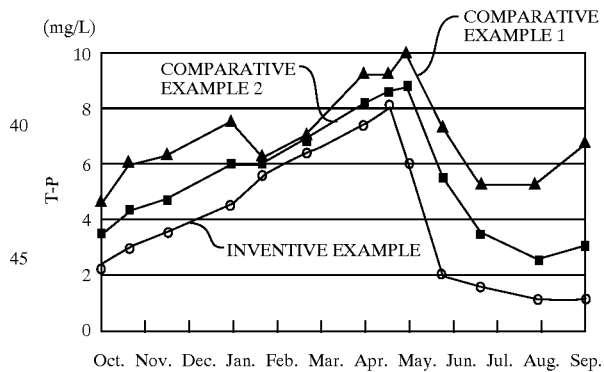

TABLE 7

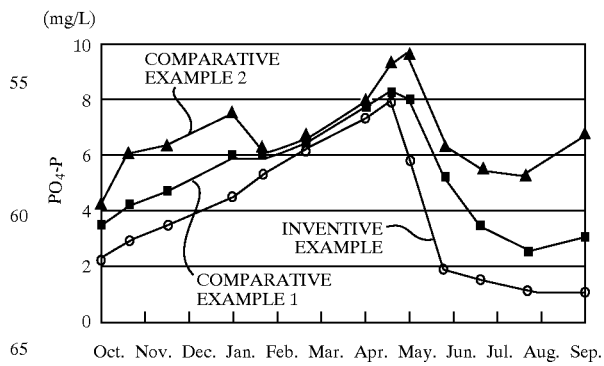

TABLE 1 shows measured values of pH concentration of the purified wastewater, and indicates that pH of the purified wastewater was in a neutral range all year in the Inventive Example, while pH thereof had a tendency to become lower (acidic) in the Comparative Examples 1 and 2. The data in TABLE 1 indicate that by the use of the oyster shell of which the mother-of-pearl layer b is scraped off as the microbial carrier member 15, it is possible to prevent effectively the acidification of the purified wastewater.

TABLES 2 to 4 show, respectively, measured values of the variation of suspended solids (SS, mg/L), BOD (biochemical Oxygen Demand, mg/L) and COD (Chemical Oxygen Demand, mg/L) of the purified wastewater in Inventive Example and Comparative Examples 1 and 2, and indicate that by the use of oyster shells of which the mother-of-pearl layer b is scraped off as the microbial carrier member 15, it is possible that excrements in the wastewater can be effectively decomposed and the wastewater can be purified from the beginning of operation after installment of the wastewater purifying apparatus.

TABLE 5 shows measured values of the variation of coliform bacteria count of the purified wastewater, and indicates that by the use of oyster shells of which the mother-of-pearl layer b is scraped off as the microbial carrier member 15, the bacteria count of the wastewater can be decreased effectively.

TABLES 6 and 7 show, respectively, measured values of the variation of total amount of phosphorus components (T-P) and amount of phosphorus components as phosphate (P04-P) in the purified wastewater, and indicate that by the use of oyster shells of which the mother-of-pearl layer b is scraped off as the microbial carrier member 15, the amount of phosphorus components and of phosphate in the wastewater can be decreased effectively.

In the first embodiment of the invention, an activated carbon adsorption chamber 9 containing an activated carbon container 22 packed with a coal-based activated carbon is arranged downstream of the first and second shell contact aeration chambers 6 and 7, and thus the wastewater processed in the first and second shell contact aeration chambers 6 and 7 can be decolorized effectively in the activated carbon adsorption chamber 9.

Experiments to determine the variation of color of the purified water were carried out in Inventive Example wherein a coal-based activated carbon was packed in the activated carbon container 22, and Comparative Example wherein a palm shell activated carbon was packed, and the results are shown in TABLE 8. The data indicate that the use of the coal-based activated carbon provides a longer period of favorable decolorization than the use of the palm shell activated carbon.

TABLE 8

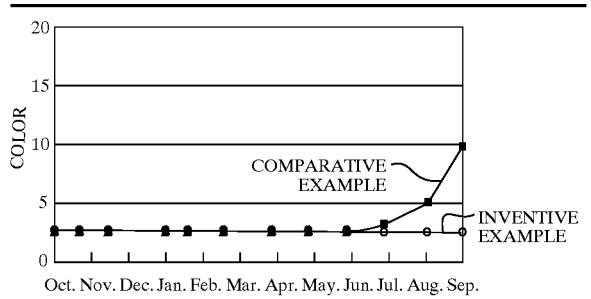

In particular, an arrangement described in the first embodiment, wherein the wastewater in the activated carbon adsorption chamber 9 is withdrawn and pumped into the lower portion of the activated carbon container 22, and circulated back into the activated carbon adsorption chamber 9 has an advantage in that the color components in the wastewater can be adsorbed more efficiently on the coal-based activated carbon in the activated carbon container 22 and thus the decolorization of the wastewater can be increased.

An arrangement of the first embodiment wherein the filtration chamber 5 placed with plastic microbial carrier 12 is placed upstream of the first and second shell contact aeration chambers 6 and 7, i.e., partially purified wastewater being fed to the first and second shell contact aeration chambers 6 and 7, has an advantage in that it can effectively prevent defacement and disappearance by dissolution of the shells such as oyster shells or the like which are placed in the first and second shell contact aeration chambers 6 and 7.

Figure 6:
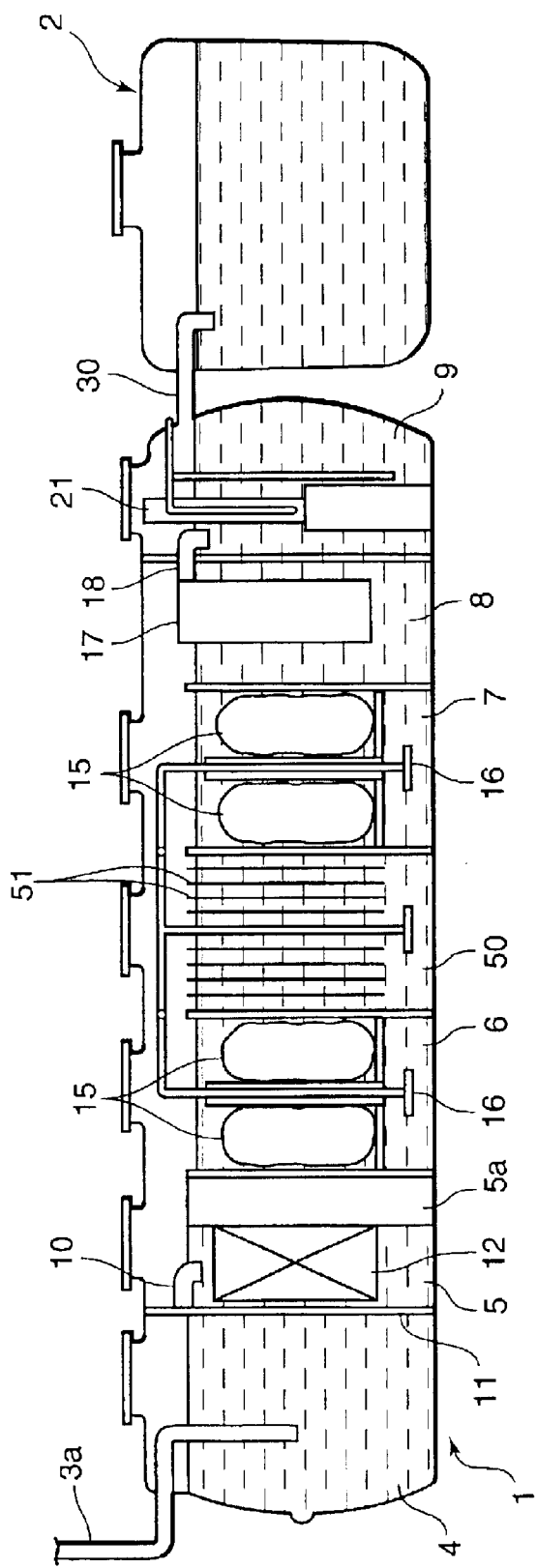
FIG. 6 is a diagram illustrating a wastewater purifying apparatus in a second embodiment of the present invention.

Especially, as shown in FIG. 6, an arrangement wherein an additional sedimentation chamber 5a for the sedimentation of sludge in the aerated wastewater transferred from the aeration chamber 5 is placed between the aeration chamber 5 and the first shell contact aeration chamber 6, can decrease more efficiently defacement and disappearance by dissolution of the shells placed in the first and second shell contact aeration chambers 6 and 7.

In the second embodiment shown in FIG. 6, between the first shell contact aeration chamber 6 and the second shell contact aeration chamber 7 is arranged a denitrification chamber 50, wherein bioreactors, membranous containers in the shape of bags made of a membrane material such as polyethylene or the like containing a hydrogen donor, i.e., an organic hydrocarbon such as methanol and the like are placed.

In the wastewater purifying apparatus fitted with the first and second shell contact aeration chambers 6 and 7, when the denitrification chamber 50 fitted with the bioreactors 51 is placed upstream of the second shell contact aeration chamber 7, ammonia components in the wastewater can be removed by being converted, via nitrous acid and nitric acid, to nitrogen gas by the denitrification action of the denitrifying bacteria adherent to the surface of the membranous containers constituting the bioreactor 51 utilizing the hydrogen donor, and therefore amount of ammonia and nitrogen components in the wastewater can be markedly reduced.

The arrangement above has also an advantage in that when an excess amount of the hydrogen donor are released from the bioreactor 51, the hydrogen donor can be decomposed by calcium carbonate being dissolved from the shells in the second shell contact aeration chamber 7. As the denitrifying bacteria are anaerobic, it is not desirable to supply a large amount of air into the denitrification chamber 50, however it is possible to increase denitrification efficiency of the denitrifying bacteria by supplying a limited amount of air only sufficient for agitation of the wastewater in the denitrification chamber 50 through the aeration nozzle 16.

Instead of arranging a denitrification chamber 50 between the first and second shell contact aeration chambers 6 and 7 as described in the embodiment above, the denitrification chamber 50 may be placed upstream of the first shell contact aeration chamber 6. In the first and second embodiments of the invention, an arrangement of a processing tank 1 comprising a settling chamber 4, an aeration chamber 5, a sedimentation chamber 5a, first and second shell contact aeration chambers 6 and 7, a denitrification chamber 50, a sedimentation filtration chamber 8, and an activated carbon adsorption chamber 9 is described, but chambers necessary as components for the wastewater purification apparatus and an arrangement of the chambers are not limited to the embodiments above, and a variety of modifications are possible within the scope of the present invention.

Figure 7:
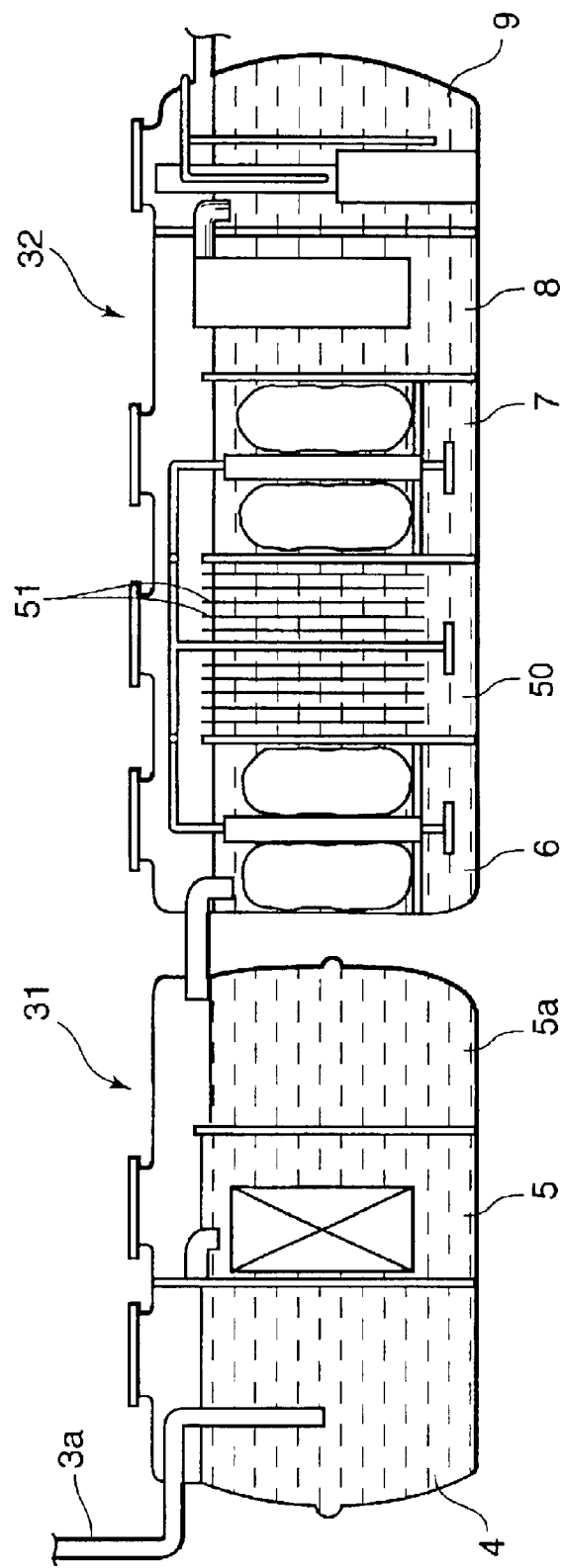
FIG. 7 is a diagram illustrating a wastewater purifying apparatus in a third embodiment of the present invention.

As shown in FIG. 7, the wastewater processing apparatus may, for example, have an arrangement including the following two separately manufactured tanks, a first processing tank 31 comprising a settling chamber 4, an aeration chamber 5, and a sedimentation chamber 5a, and a second processing tank 32 comprising first and second shell contact aeration chambers 6 and 7, a denitrification chamber 50, a sedimentation filtration chamber 8, and an activated carbon adsorption chamber 9. Alternatively, by eliminating the first processing tank 31 comprising a settling chamber 4, a filtration chamber 5, and a sedimentation chamber 5a, wastewater discharged form lavatories 3 may be fed directly to the first shell contact aeration chamber 6 in the processing tank 32, and processed in the first contact aeration chamber 6, the denitrification chamber 50, the second shell contact aeration chamber 7, the sedimentation filtration chamber 8, and the activated carbon adsorption chamber 9, in the order.

INDUSTRIAL APPLICABILITY

As described above, the wastewater purifying apparatus is useful for decomposition of the excrements in wastewater discharged form lavatories and the like and for purification of the wastewater, and can exert its excellent purification potential from the beginning of operation after installment of the wastewater purifying apparatus and is suitable for suppressing acidification of the purified wastewater.

What is claimed is:

1. A wastewater purifying apparatus comprising a shell contact aeration chamber including calcium carbonate based shells of shellfish for purifying supplied wastewater therein, the shells being used as microbial carriers with a mother-of-pearl layer on inner surfaces of the shells being removed.

2. A wastewater purifying apparatus according to claim 1, further comprising an activated carbon adsorption chamber including coal-based activated carbon and arranged downstream of the shell contact aeration chamber.

3. A wastewater purifying apparatus according to claim 1, further comprising a denitrification chamber which is arranged upstream of the shell contact aeration chamber, the denitrification chamber being provided with a bioreactor including a membranous container containing a hydrogen donor.

4. A wastewater purifying apparatus according to claim 1, wherein the shellfish includes at least one of oysters, scallops, Sakhalin clams, pearl shells, clams, fresh water claims, short-necked clams, Chinese mecta, mussels, top shells, giant clams and fossil shells.

5. A wastewater purifying apparatus according to claim 1, wherein the shells are packed in a mesh bag and installed in the shell contact aeration chamber.

* * * * *